United States Patent [19]
Greene

[11] Patent Number: 5,905,432
[45] Date of Patent: May 18, 1999

[54] VEHICLE ANTI-THEFT AND ANTI-VANDALISM ALARM

[76] Inventor: Desmond Greene, 15443 Grandville, Detroit, Mich. 48223

[21] Appl. No.: 09/132,046

[22] Filed: Aug. 11, 1998

[51] Int. Cl.⁶ .................................................. B60R 25/10
[52] U.S. Cl. ...................... 340/426; 340/425.5; 340/539; 340/825.31; 340/825.32; 379/58; 379/59
[58] Field of Search ................................ 340/426, 425.5, 340/539, 825.31, 825.32; 379/58, 59; 341/174, 175, 176

[56] References Cited

U.S. PATENT DOCUMENTS

| | | | |
|---|---|---|---|
| 5,140,308 | 8/1992 | Tanaka | 340/539 |
| 5,490,200 | 2/1996 | Snyder et al. | 379/57 |
| 5,588,038 | 12/1996 | Snyder | 379/57 |
| 5,648,754 | 7/1997 | Hwang | 340/426 |
| 5,652,564 | 7/1997 | Winbush | 340/426 |
| 5,654,688 | 8/1997 | Allen et al. | 340/426 |
| 5,673,305 | 9/1997 | Ross | 379/58 |

*Primary Examiner*—Jeffery A. Hofsass
*Assistant Examiner*—Daryl C. Pope

[57] ABSTRACT

A vehicle anti-theft and anti-vandalism alarm system (10) having a vehicle monitor which comprises at least one vehicle battery (12), at least one vehicle microprocessor (14) electrically connected to the at least one vehicle battery (12), a vehicle transmitter (16), a vehicle audio generator (18), a vehicle motion sensor (20), a vehicle vibration/movement sensor (22), a portable monitor (110) in communication with the vehicle monitor. The portable monitor (110) comprises at least one portable monitor battery (112) positioned within a portable monitor housing (126), at least one portable monitor microchip (114) electrically connected to at least one portable monitor battery (112), a portable monitor receiver (116) electrically connected to at least one portable monitor microchip (114), a portable monitor audio generator (118), a portable monitor illegal ENTRY visual indicator (120), a portable monitor SHOCK visual indicator (122) electrically connected to at least one portable monitor microchip (114), a portable monitor switch (124) electrically connected to at least one portable monitor microchip (114), and a vehicle microprocessor software program (210) contained within the at least one vehicle microprocessor (14) and a portable monitor microchip software program (310) contained within the at least one portable monitor microchip.

8 Claims, 3 Drawing Sheets

VEHICLE ANTI-THEFT AND ANTI-VANDALISM ALARM

BACKGROUND OF THE INVENTION

1. Field of the Invention

The present invention relates to anti-theft devices. More particularly, the present invention relates to anti-theft devices which have a remote device.

2. Description of the Prior Art

A wide variety of vehicle anti-theft systems have been deveoped and proposed which include a remote device which communicates with the alarm device mounted in a vehicle. Typically, these devices are used with sensors which indicate the status of openings such as doors, ambient noise, and movement. The remote device functions to arm or disarm the alarm from a distance and is a convenience item. A few alarms systems provide a feedback to the remote when a sensor is tripped. This information is of limited value and requires verification by a user. This necessitates the user returning to the vehicle to check the status. What is needed, is a device which indicates on the remote the type of senor trip and the nature of the cause. This enables the user to provide the proper responce sooner. For example a movement sensor trip and a level sensor trip could cause the remote to display a message indicating the vehicle is being towed.

Numerous innovations for vehicle anti-theft and anti-vandalism alarm system have been provided in the prior art that are described as follows. Even though these innovations may be suitable for the specific individual purposes to which they address, they differ from the present invention as hereinafter contrasted.

In U.S. Pat. No. 5,689,142, titled Keyless Motor Vehicle Starting System with Anti-theft feature, invented by Chun-yan Liu, a keyless motor vehicle starting system to replace a conventional ignition lock and ignition key of a motor vehicle. The system consists of a portable wireless transmitter and a receiver/controller board which is installed deeply inside the motor vehicle behind a steering column cover or cluster cover of the motor vehicle. The portable wireless transmitter has a power-code generator and a starter-code generator and controls a vehicle battery power supply and ON-OFF states of a motor vehicle starter by sending a radio-frequency-modulated power-code and starter code. A novel design is disclosed to avoid having to detect engine-running conditions and avoid using a feed-back-control circuit to de-energize the motor starter.

The patented invention differs from the present invention because the patented invention is a keyless motor vehicle starting system to replace a conventional ignition lock and ignition key of a motor vehicle. The patented invention lacks features similar to the present invention.

In U.S. Pat. No. 5,535,844 titled Vehicle Anti-theft Device, invented by Ricky L. Samford, a vehicle anti-theft device including a portable transmitter for emitting control signals; a tuned receiver mechanism coupleable to a vehicle for receiving the control signals; a first switch having an engaged orientation for preventing a hood of a vehicle from being opened; a second switch having an engaged orientation for preventing flow of fuel from a gas tank to an engine of a vehicle; and a console mechanism coupled to the receiver mechanism and responsive to the received control signals for placing the first and second switches in their engaged orientations upon receipt of control signals.

The patented invention differs from the present invention because the patented invention is a vehicle anti-theft device including a portable transmitter for emitting control signals. The transmitter is hand help and lacks the capability of receiving signals from the vehicle. The present invention is a receiver which display the security status of the vehicle.

In U.S. Pat. No 5,459,448, titled Automotive Continuous Protection Anti-theft System, invented by Christopher S. Dortenzio and Brian H. Twohig, an automotive security device of the type consisting of: (a) a portable unit and (b) a central unit. The portable unit consisting of a transmitter circuit and a pulse duration circuit being capable of transmitting specified signal pulses at periodic intervals over a limited distance. The central unit, which is mounted in the vehicle, consisting of a receiver circuit and an interface circuit being capable of receiving these signals and activating the vehicle electrical system upon receiving said signal and deactivating the vehicle electrical system upon the absence of said signal.

The patented invention differs from the present invention because the patented invention is a vehicle anti-theft device including a portable transmitter for emitting control signals. The transmitter is hand help and lacks the capability of receiving signals from the vehicle. The present invention is a receiver which display the security status of the vehicle. The central unit of the patented invention, which is mounted in the vehicle, consists of a receiver circuit and an interface circuit being capable of receiving these signals and activating the vehicle electrical system upon receiving said signal and deactivating the vehicle electrical system upon the absence of said signal. The central unit lacks the feature transmitting vehicle security status to the remote unit.

In U.S. Pat. No. 5,370,201, titled Anti-theft Devices for Motor Vehicles, invented by Hajime Inubushi, an anti-theft device for a motor vehicle includes in combination an electromagnetic wave receiver, e.g. a cellular telephone, a disabling unit which when energized by the receiver will cause the vehicle's engine to stop running and a portable electromagnetic wave transmitter, e.g., a cellular telephone, capable of emitting a signal receptive by the receiver to effect energizing of the disabling unit. In one embodiment, the disabling unit opens the electrical motor control system to stop the engine. In another embodiment, the disabling unit stops flow of fuel to the engine thereby stopping it.

The patented invention differs from the present invention because the patented invention is a disabling unit, mounted in the vehicle, which when energized by the receiver causing the vehicle's engine to stop running. The present invention is a remote portable vehicle theft alert device which consists of a car alarm having a transmitter which transmits signals received from a processor component. A plurality of sensors. A processing device functioning to process preselected signals from A group of sensors into A specific output signal representative of A preassigned category of sensor trip. (IE: A motion sensor trip would result in A signal indicating the vehicle was moved or sustained impact damage.) The processing device then sends A coded signal to the transmitter where it is transmitted. The present invention includes A receiver device having A housing. The housing contains A receiver which receives A signal from the transmitter and sends the coded signal to A second processor for decoding. A second processor functioning to decode the transmitted signal and prepare A display format which is sent to an indicating device. An indicating device selected from A group consisting of A light source, LCD display module, A plurality of LEDs and audible devices. The indicating device functions to display messages indicating the A status of the vehicle security. The receiver includes A power source which is electrically connected to the processor, indication device and receiver. The present receiver further, includes an attachment means functioning to attach the housing to A person. The novel feature of the present invention is the ability for the user to determine if the vehicle is being broken into, hit by an object and being moved.

In U.S. Pat. No. 5,049,867, titled Vehicle Security Apparatus, invented by Peter J. Stouffer, A vehicle security apparatus includes A portable transmitter generating at least one discrete coded signal. A receiver mounted in the vehicle in response to the first receipt and recognition of A discrete coded signal from the transmitter arms an anti-theft system in the vehicle security apparatus. The anti-theft system includes A starter interrupt which prevents the starting of the vehicle when the anti-theft system is armed and/or alarms, both visual and/or audible, to indicate an attempted access to the vehicle. The receiver is capable of learning one or more codes associated with specific transmitters. A sensor is mounted on the vehicle to detect attempted access to the vehicle. The receiver, when armed and receiving an output from the sensor, activates the starter interrupt and/or the alarm for A predetermined time. The receiver is optionally capable of automatically operating the vehicle door locks, the vehicle hood latch and trunk latches, as well as the inside vehicle lights automatically during the arming and disarming seqences.

The patented invention differs from the present invention because the patented invention is A portable transmitter generating at least one discrete coded signal and A receiver mounted in the vehicle which responds to the first receipt and recognition of A discrete coded signal from the transmitter arms an anti-theft system in the vehicle security apparatus. A sensor is mounted on the vehicle to detect attempted access to the vehicle. The receiver, when armed and receiving an output from the sensor, activates the starter interrupt and/or the alarm for A predetermined time. The vehicle mounted devices lack A transmitting capability.

In U.S. Pat. No. 4,940,964, titled Vehicle Control and Theft Deterrent with Remot, invented by Victor Dao, A motor vehicle control system is described having A vehicle control unit located in the motor vehicle and A hand held portable control unit, which are in two-way communication. The vehicle control unit which is located in the motor vehicle includes A receiving antenna, A receiver, A decoder and A plurality of functional control circuits, with each control circuit for A respective functional operation of the motor vehicle such as ignition, starter activation, heater, air conditioner, door locks, etc. The control unit in the motor vehicle also includes A transmitter and A scanner unit which has A like plurality of sensors for sensing the condition of the various functional operations such as the ignition, engine operation, air conditioner status, heater status, etc. The control unit transmits A radio frequency signal to the remote control unit, which indicates the condition of the sensed operations. The remote control unit has an antenna and receiver with an audio amplifier and speaker. The remote unit has A standard key pad in circuit to an encoder to produce A signal that is applied to the transmitter for transmission to the vehicle control unit. In A preferred embodiment, the motor vehicle control unit has A voice synthesizer to generate A voice signal that is transmitted to the remote control unit, and most preferably has A digital voice recorder, permitting the user to customize the unit to repeat any selected message. This is particularly of value to adapt the system for foreign language users.

The patented invention differs from the present invention because the patented invention is A motor vehicle control system having A vehicle control unit located in the motor vehicle and A hand held portable control unit, which are in two-way communication. The control unit in the motor vehicle also includes A transmitter and A scanner unit which has A like plurality of sensors for sensing the condition of the various functional operations such as the ignition, engine operation, air conditioner status, heater status, etc. The control unit transmits A radio frequency signal to the remote control unit, which indicates the condition of the sensed operations. The remote control unit has antenna and receiver with an audio amplifier and speaker. The remote unit has A standard key pad in circuit to an encoder to produce A signal that is applied to the transmitter for transmission to the vehicle control unit. In A preferred embodiment, the motor vehicle control unit has A voice synthesizer to generate A voice signal that is transmitted to the remote control unit, and most preferably has A digital voice recorder, permitting the user to customize the unit to repeat any selected message. The patented invention has features which are similar to the present invention including the transmission of information from the vehicle to the receiver indicating the status of sensor installed on the vehicle. The present invention is simpler because the hand held unit only receives information. The present invention is unique in that the status information is displayed where as the patented invention the status information uses A voice synthesizer to generate A voice signal that is transmitted to the remote control unit, and most preferably has A digital voice recorder, permitting the user to customize the unit to repeat any selected message.

In U.S. Pat. No. 4,733,638, titled Automotive Anti-theft Starting System, invented by Lyle V. Anderson, A security starting system for A motor vehicle is disclosed. The system includes A portable hand-held transmitting device carried in the passenger compartment of the vehicle; by the operator and A receiving device located in the housing of the starter in the engine compartment of the vehicle. An operator desiring to start the vehicle actuates the transmitter. When the receiver detects the transmitted signal, it produces an electrical signal which closes A switch connected in series to the motor vehicle ignition system thereby allowing the ignition switch of the ignition system to start the vehicle.

The patented invention differs from the present invention because the patented invention is A security starting system for A motor vehicle. The patented invention lacks features similar to the present invention.

Numerous innovations for vehicle anti-theft and anti-vandalism alarm system have been provided in the prior aft that are adapted to be used. Even though these innovations may be suitable for the specific individual purposes to which they address, they would not be suitable for the purposes of the present invention as heretofore described.

SUMMARY OF THE INVENTION

The present invention is a remote portable vehicle theft alert device which consists of a car alarm having a transmitter which transmits signals received from a processor component. A a plurality of sensors. A processing device functioning to process preselected signals from a group of sensors into a specific output signal representative of a preassigned category of sensor trip. (IE: a motion sensor trip would result in a signal indicating the vehicle was moved or sustained impact damage.) The processing device then sends a coded signal to the transmitter where it is transmited. The present invention includes a receiver device having a housing. The housing contains a receiver which receives a signal from the transmitter and sends the coded signal to a second processor for decoding. A second processor functioning to decode the transmitted signal and prepare a display format which is sent to an indicating device. An indicating device selected from a group consisting of a light source, LCD display module, a plurality of LEDs and audible devices. The indicating device functions to display messages indicating the a status of the vehicle security. The receiver includes a power source which is electrically connected tothe procreeso, indication device and receiver. The present receiver further, includes an attachment means functioning to attach the housing to a person. The novel feature of the present invention is the ability for the user to determine if the vehicle is being broken into, hit by an object and being moved.

The types of problems encountered in the prior art are vehicles are vandlized or stolen without notification to the owner.

In the prior art, unsucessful attempts to solve this problem were attempted namely: alarm systems having an audible output enabled by any sensor trip and remote device coupled with the alarm which permit arming and disarming the system from a distance. However, the problem was solved by the present invention because for preselected combinations of sensor trips the remote indicates the nature of the sensor trip.

Innovations within the prior art are rapidly being exploited as vehicle theft rises and more alarm systems are factory or dealer installed when new cars are purchased.

The present invention went contrary to the teaching of the art by providing a intelligent status indication on the remote device.

The present invention solved a long felt need for way of determining the proper responce to an alarm trip.

A synergistic effect was produced utilizing the present invention due to the following facts and results from experimentation: the number ofvehicle theft false alarms calls to the law enforcement agencies are reduced.

Accordingly, it is an object of the present invention to provide a remote indication of vehicle status based on preselected responces to combination of sensor trips.

More particularly, it is an object of the present invention to provide a vehicle monitor system having multiple sensors which are monitored by a central processor.

In keeping with these objects, and with others which will become apparent hereinafter, one feature of the present invention resides, briefly stated, in a central procesor which determines from sensor trip informtion the cause of the sensor trips.

When the vehicle anti-theft and anti-vandalism alarm system is designed in accordance with the present invention, the user can differentiate from the indication on the remote display if the vehicle is being stolen, broken in to, has been damaged, if it is being towed, or an audible alarm has been tripped.

In accordance with another feature of the present invention, a portable monitor is provided.

Another feature of the present invention is that the portable monitor contains a power source such as a battery.

Yet another feature of the present invention is that the portable monitor has a portable monitor microchip which is programed to monitor sensor imputs and determine responces to preselected combinations of sensor trips.

Still another feature of the present invention is that a portable monitor receiver receives signals sent from the vehicle monitor.

Yet still another feature of the present invention is that a portable monitor audio generator provides a audible alarm signal from the remote.

Still yet another feature of the present invention is that a portable monitor ENTRY visual indicator is enabled when a combination of sensors indicate that a person is in the vehicle.

Another feature of the present invention is that a portable monitor SHOCK visual indicator is enabled when a combination of sensors indicate that a the vehicle may have been damaged by a collision.

Yet another feature of the present invention is that a portable monitor switch controls power to the remote.

Still another feature of the present invention is that a portable monitor housing clip permits attachment of the portable monitor to objects or a person.

Yet still another feature of the present invention is that a portable monitor vibrating means provides a vibrationsensory input to the user when an alarm trip is indicated which silient.

Still yet another feature of the present invention is that the vehicle monitor has a vehicle transmitter which sends signals to the portable monitor.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—vehicle anti-theft and anti-vandalism alarm system (10)

VEHICLE MONITOR

12—vehicle battery (12)
14—vehicle microprocessor (14)
16—vehicle transmitter (16)
18—vehicle audio generator (18)
20—vehicle motion sensor (20)
22—vehicle vibration/movement sensor (22)

PORTABLE MONITOR

110—portable monitor (110)
112—portable monitor battery (112)
114—portable monitor microchip (114)
116—portable monitor receiver (116)
118—portable monitor audio generator (118)
120—portable monitor illegal ENTRY visual indicator (120)
122—portable monitor SHOCK visual indicator (122)
124—portable monitor switch (124)
126—portable monitor housing (126)
126A—portable monitor housing clip (126A)
128—portable monitor vibrating means (128)
130—portable monitor arm/disarm switch (130)
132—portable monitor vehicle audio generator trip indicator (130)

132A—portable monitor vehicle audio generator trip On/off switch (132A)

DESCRIPTION OF THE PREFERRED EMBODIMENT

Figure 1:
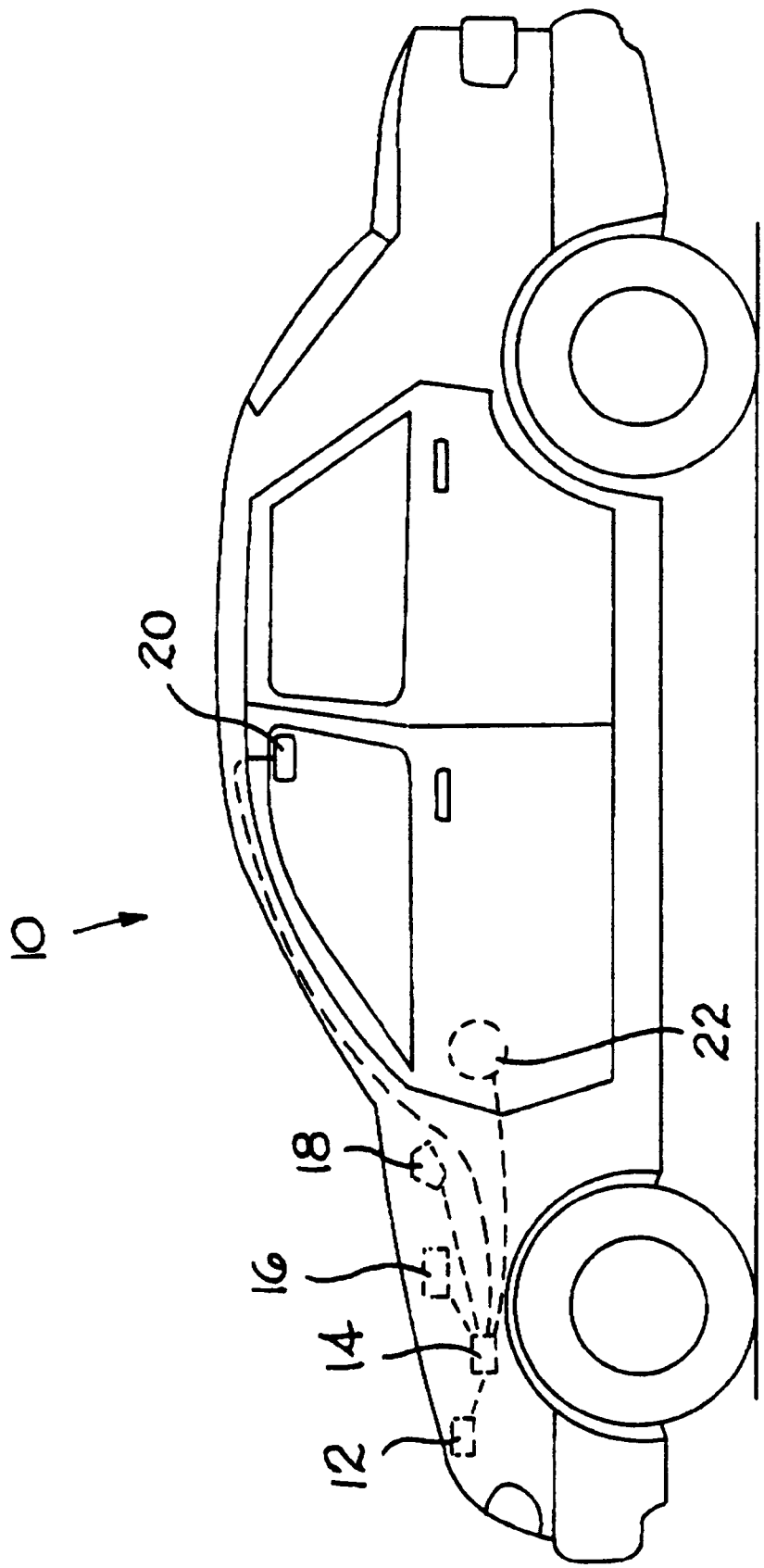
FIG. 1 is a side view of a vehicle with the vehicle anti-theft and anti-vandalism alarm system (10) installed therein.
Figure 2:
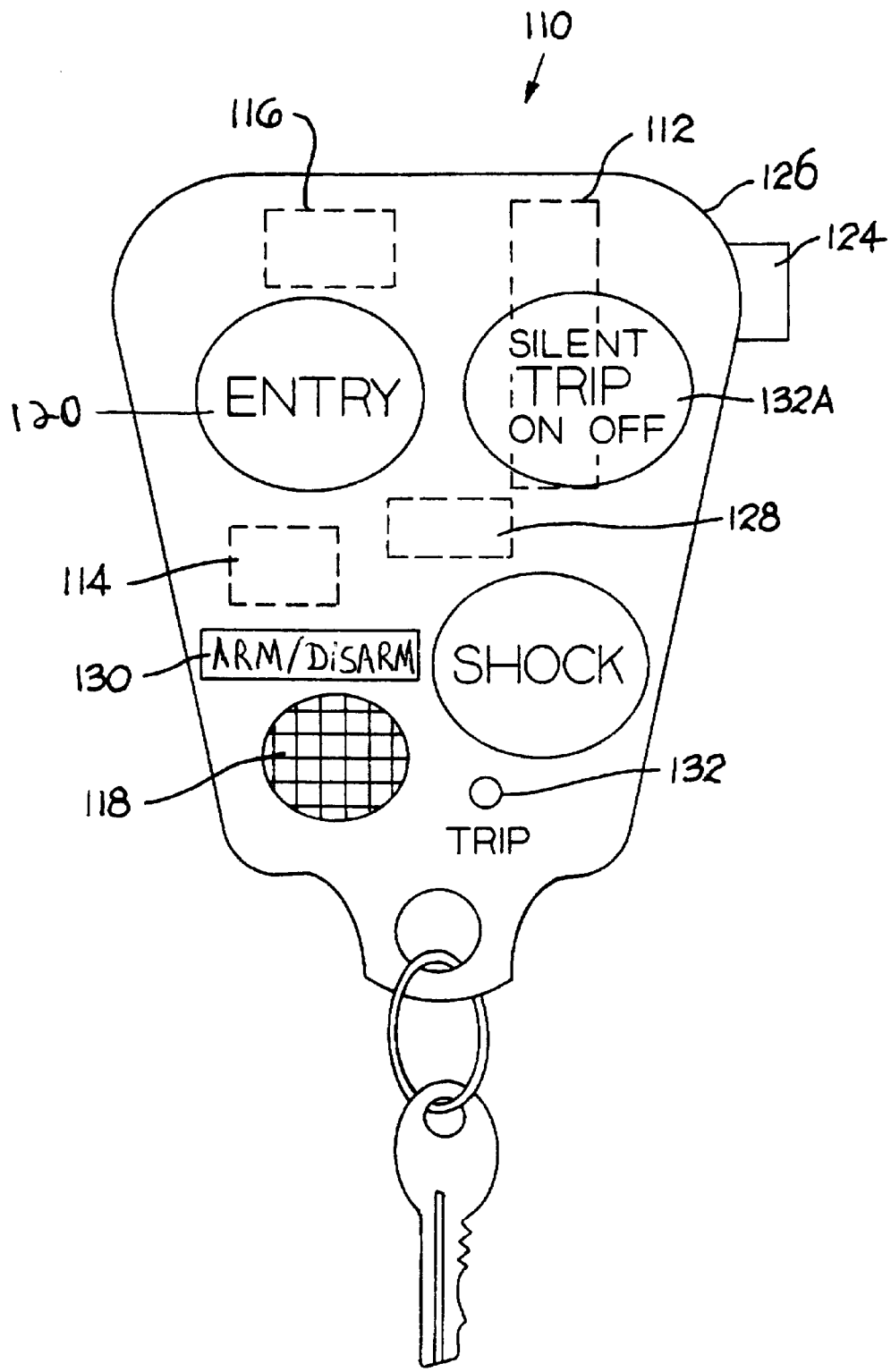
FIG. 2 is a front view of a portable monitor (110).

Referring to FIG. 1 which is a side view of a vehicle with the vehicle anti-theft and anti-vandalism alarm system (10) installed therein and FIG. 2 which is a front view of a portable monitor (110) which comprises a vehicle monitor which comprises at least one vehicle battery (12).

The portable monitor (110) further comprises at least one vehicle microprocessor (14) electrically connected to the at least one vehicle battery (12).

The portable monitor (110) further comprises a vehicle transmitter (16) electrically connected to the at least one vehicle microprocessor (14).

The portable monitor (110) further comprises a vehicle audio generator (18) electrically connected to the at least one vehicle microprocessor (14).

The portable monitor (110) further comprises a vehicle motion sensor (20) electrically connected to the at least one vehicle microprocessor (14).

The portable monitor (110) further comprises a vehicle vibration/movement sensor (22) electrically connected to the at least one vehicle microprocessor (14).

The portable monitor (110) further comprises a portable monitor (110) in communication with the vehicle monitor. The portable monitor (10) comprises at least one portable monitor battery (112) positioned within a portable monitor housing (126).

The portable monitor (110) further comprises at least one portable monitor microchip (114) electrically connected to at least one portable monitor battery (112) positioned within a portable monitor housing (126).

The portable monitor (110) further comprises a portable monitor receiver (116) electrically connected to at least one portable monitor microchip (114) positioned within a portable monitor housing (126).

The portable monitor (110) further comprises a portable monitor audio generator (118) electrically connected to at least one portable monitor microchip (114) positioned within a portable monitor housing (126).

The portable monitor (110) further comprises a portable monitor illegal ENTRY visual indicator (120) electrically connected to at least one portable monitor microchip (114) positioned within a portable monitor housing (126).

The portable monitor (110) further comprises a portable monitor vehicle audio generator visual indicator (132) electrically connected to at least one portable monitor microchip (114) positioned within a portable monitor housing (126).

The portable monitor (110) further comprises a portable monitor SHOCK visual indicator (122) electrically connected to at least one portable monitor microchip (114) positioned within a portable monitor housing (126).

The portable monitor (110) further comprises a portable monitor switch (124) electrically connected to at least one portable monitor microchip (114) positioned within a portable monitor housing (126). The portable monitor switch (124) comprises three positions: audio ON, vibration ON, and audio and vibration ON.

The portable monitor (110) further comprises a vehicle microprocessor software program (210) contained within the at least one vehicle microprocessor (14) and a portable monitor microchip software program (310) contained within the at least one portable monitor microchip. The software programs consist of the following steps:

i) first detecting (212) movement by the vehicle motion sensor (20) within a vehicle;
  iii) first sending (214) an electrical signal to the vehicle transmitter (16);
  iv) first transmitting (216) a motion alarm signal from the vehicle transmitter (16);
  v) first receiving (312) by the portable monitor receiver (116) the motion alarm signal from the vehicle transmitter (16);
  vi) second sending (314) an electrical signal to the at least one portable monitor microchip (114); and
  vii) third sending (316) an electrical signal to the portable monitor illegal ENTRY visual indicator (120).

The vehicle microprocessor software program (210) contained within the at least one vehicle microprocessor (14) and a portable monitor microchip software program (320) contained within the at least one portable monitor microchip. The software programs may optionally consist of the following steps:

A) second detecting (212A) impact by the vehicle vibration/movement sensor (22) from the vehicle;
  B) fourth sending (214A) an electrical signal to the vehicle transmitter (16);
  C) second transmitting (216A) a shock alarm signal from the vehicle transmitter (16);
  D) second receiving (312A) by the portable monitor receiver (116) the shock alarm signal from the vehicle transmitter (16);
  E) fifth sending (314A) an electrical signal to the at least one portable monitor microchip (114); and
  F) sixth sending (316) an electrical signal to the portable monitor SHOCK visual indicator (122).

The portable monitor microchip software program (310) may optionally consist of the following steps:

A) seventh sending (318) a signal from the at least one portable monitor microchip (114) to the portable monitor audio generator (118) producing sound therefrom.

The portable monitor microchip software program (310) may optionally consist of the following steps:

A) eighth sending (320) a signal from the at least one portable monitor microchip (114) to the portable monitor audio generator (118) producing sound therefrom.

The portable monitor (110) may optionally further comprise a portable monitor vibrating means (128) eletrically connected to the portable monitor microchip (114). If present, the portable monitor microchip software program (310) consists of the following steps:

A) eighth sending (322) a signal from the at least one portable monitor microchip (114) to the portable monitor microchip (114) producing vibration therefrom.

The vehicle anti-theft and anti-vandalism alarm system (10) as described in claim 1, wherein the portable monitor (110) further comprises a portable monitor arm/disarm switch (130), having an arm position and a disarm position, which is electrically connected to the portable monitor microchip (114).

The portable monitor microchip software program (310) may optionally consist of the following steps:

A) ninth sending (322) a first signal from the portable monitor arm/disarm switch (130) to the portable monitor microchip (114) functioning to disarm the vehicle anti-theft and anti-vandalism alarm system (10)

The portable monitor microchip software program (310) may optionally consist of the following steps:

A) tenth sending (322) a first signal from the portable monitor arm/disarm switch (130) to the portable monitor microchip (114) functioning to arm the vehicle anti-theft and anti-vandalism alarm system (10)

Figure 3:
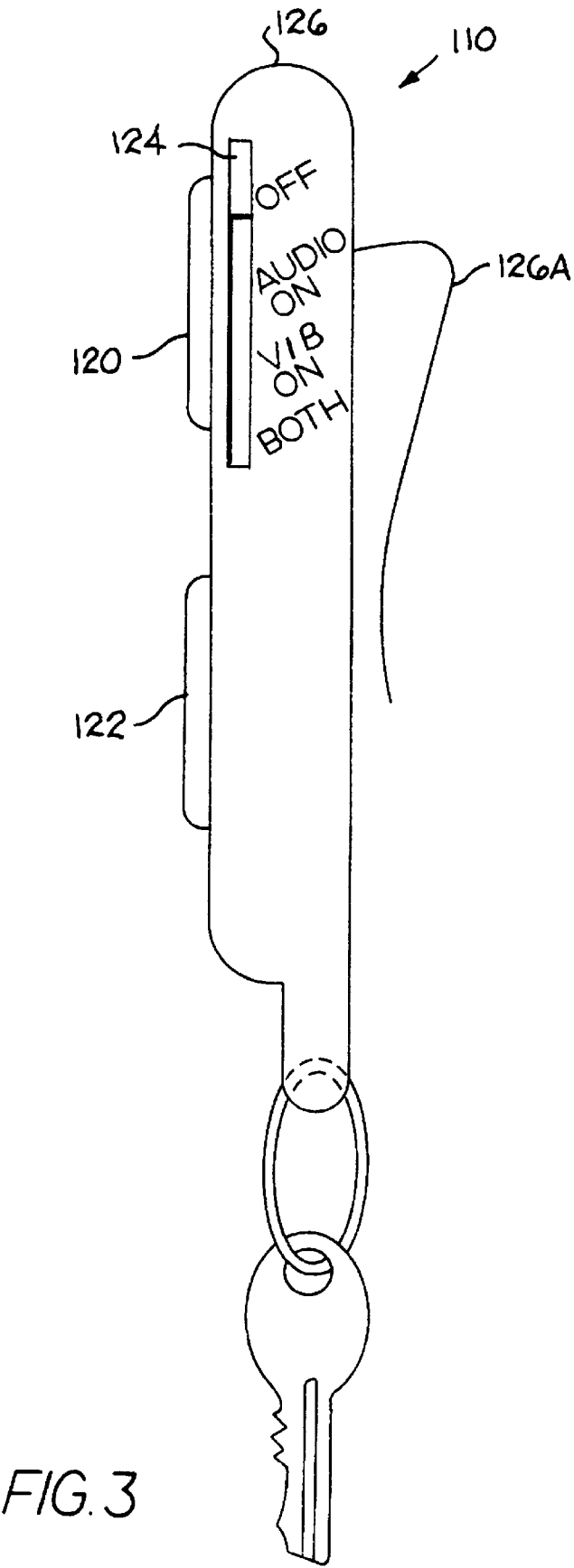
FIG. 3 is a side view of a portable monitor (110).

Lastly, referring to FIG. 3 which is a side view of a portable monitor (110). The portable monitor housing (126) may optionally comprises a portable monitor housing clip (126A) securely fastened thereon.

It will be understood that each of the elements described above, or two or more together, may also find a useful application in other types of constructions differing from the type described above.

While the invention has been illustrated and described as embodied in a vehicle anti-theft and anti-vandalism alarm system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A vehicle anti-theft and anti-vandalism alarm system (10) comprising:

A) a vehicle monitor which comprises at least one vehicle battery (12);

B) at least one vehicle microprocessor (14) electrically connected to the at least one vehicle battery (12);

C) a vehicle transmitter (16) electrically connected to the at least one vehicle microprocessor (14);

D) a vehicle audio generator (18) electrically connected to the at least one vehicle microprocessor (14);

E) a vehicle motion sensor (20) electrically connected to the at least one vehicle microprocessor (14);

F) a vehicle vibration/movement sensor (22)electrically connected to the at least one vehicle microprocessor (14);

G) a portable monitor (110) in communication with the vehicle monitor, the portable monitor (110) comprises at least one portable monitor battery (112) positioned within a portable monitor housing (126);

H) at least one portable monitor microchip (114) electrically connected to at least one portable monitor battery (112) positioned within a portable monitor housing (126);

I) a portable monitor receiver (116) electrically connected to at least one portable monitor microchip (114) positioned within a portable monitor housing (126);

J) a portable monitor audio generator (118) electrically connected to at least one portable monitor microchip (114) positioned within a portable monitor housing (126);

K) a portable monitor illegal ENTRY visual indicator (120) electrically connected to at least one portable monitor microchip (114) positioned within a portable monitor housing (126);

L) a portable monitor SHOCK visual indicator (122) electrically connected to at least one portable monitor microchip (114) positioned within a portable monitor housing (126);

M) a portable monitor switch (124) electrically connected to at least one portable monitor microchip (114) positioned within a portable monitor housing (126), the portable monitor switch (124) comprises three positions: audio ON, vibration ON, and audio and vibration ON;

N) a vehicle microprocessor software program (210) contained within the at least one vehicle microprocessor (14) and a portable monitor microchip software program (310) contained within the at least one portable monitor microchip, the software programs consist of the following steps:

i) first detecting (212) movement by the vehicle motion sensor (20) within a vehicle;

ii) first sending (214) an electrical signal to the vehicle transmitter (16);

iii) first transmitting (216) a motion alarm signal from the vehicle transmitter (16);

iv) first receiving (312) by the portable monitor receiver (116) the motion alarm signal from the vehicle transmitter (16);

v) second sending (314) an electrical signal to the at least one portable monitor microchip (114); and vi) third sending (316) an electrical signal to the portable monitor illegal ENTRY visual indicator (120);

vii) second detecting (212A) impact by the vehicle vibration/movement sensor (22) from the vehicle;

viii) fourth sending (214A) an electrical signal to the vehicle transmitter (16);

ix) second transmitting (216A) a shock alarm signal from the vehicle transmitter (16);

x) second receiving (312A) by the portable monitor receiver (116) the shock alarm signal from the vehicle transmitter (16);

xi) fifth sending (314A) an electrical signal to the at least one portable monitor microchip (114);

xii) sixth sending (316) an electrical signal to the portable monitor SHOCK visual indicator (122);

xiii) seventh sending (318) a signal from the at least one portable monitor microchip (114) to the portable monitor audio generator (118) producing sound therefrom;

xiv) eighth sending (320) a signal from the at least one portable monitor microchip (114) to the portable monitor audio generator (118) producing sound therefrom; and P) a portable monitor vibrating means (128) electrically connected to the portable monitor microchip (114) containing the portable monitor microchip software program (310) which consists of the following steps:

i) eighth sending (322) a signal from the at least one portable monitor microchip (114) to the portable monitor vibrating means (128) producing vibration therefrom.

2. The vehicle anti-theft and anti-vandalism alarm system (10) as described in claim 1, wherein the portable monitor housing (126) comprises a portable monitor housing clip (126A) securely fastened thereon.

3. The vehicle anti-theft and anti-vandalism alarm system (10) as described in claim 1, wherein the portable monitor audio generator (118) comprises an input which is electrical connected to the vehicle audio generator (18), and further comprises an enabling means which is electrically connected to the at least one vehicle microprocessor (14), the portable monitor audio generator (118) functions to produce a loud sound when the vehicle audio generator (18) is enabled by the at least one vehicle microprocessor (14).

4. The vehicle anti-theft and anti-vandalism alarm system (10) as described in claim 1, wherein the portable monitor (110) comprises a portable monitor vehicle audio generator trip indicator (130) which functions to indicate the vehicle audio generator (18) is enabled.

5. The vehicle anti-theft and anti-vandalism alarm system (10) as described in claim 1, wherein the portable monitor (110) comprises a portable monitor arm/disarm switch (130) functioning to remotely arm and disarm the vehicle anti-theft and anti-vandalism alarm system (10).

6. The vehicle anti-theft and anti-vandalism alarm system (10) as described in claim 1, wherein the portable monitor (110) further comprises a portable monitor arm/disarm switch (130), having an arm position and a disarm position, which is electrically connected to the portable monitor microchip (114).

7. The vehicle anti-theft and anti-vandalism alarm system (10) as described in claim 1, wherein the portable monitor microchip software program (310) consists of the following steps:

A) ninth sending (322) a first signal from the portable monitor arm/disarm switch (130) to the portable monitor microchip (114) functioning to disarm the vehicle anti-theft and anti-vandalism alarm system (10).

8. The vehicle anti-theft and anti-vandalism alarm system (10) as described in claim 7, wherein the portable monitor microchip software program (310) consists of the following steps:

A) tenth sending (322) a first signal from the portable monitor arm/disarm switch (130) to the portable monitor microchip (114) functioning to arm the vehicle anti-theft and anti-vandalism alarm system (10).

* * * * *